(12) United States Patent
Chandy et al.

(10) Patent No.: US 6,898,791 B1
(45) Date of Patent: May 24, 2005

(54) INFOSPHERES DISTRIBUTED OBJECT SYSTEM

(75) Inventors: K. Mani Chandy, La Cañada, CA (US); Joseph Kiniry, Pasadena, CA (US); Adam Rifkin, Pasadena, CA (US); Daniel Zimmerman, Pasadena, CA (US); Wesley Tanaka, Alea, HI (US); Luke Weisman, Cambridge, MA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/295,957

(22) Filed: Apr. 21, 1999

Related U.S. Application Data

(60) Provisional application No. 60/082,475, filed on Apr. 21, 1998.

(51) Int. Cl.[7] .................................................. G60F 9/46
(52) U.S. Cl. ......................................... 719/314; 714/15
(58) Field of Search ........................... 719/314; 703/313

(56) References Cited

U.S. PATENT DOCUMENTS

| | | | | |
|---|---|---|---|---|
| 5,584,035 A | * | 12/1996 | Duggan et al. | 345/765 |
| 5,805,824 A | * | 9/1998 | Kappe | 709/242 |
| 5,938,775 A | * | 8/1999 | Damani et al. | 714/15 |
| 6,049,838 A | * | 4/2000 | Miller et al. | 380/277 |
| 6,243,702 B1 | * | 6/2001 | Bamford et al. | 707/8 |

OTHER PUBLICATIONS

K. Mani Chandy, the Infospheres Infrastructure , Jan. 23, 1998.*
K. Mani Chandy, et al , The Infospheres Infrastructure User Guide, , The California Institute of Technology, p. 1–90.*
Chandy, et al., "II. The Infospheres Infrastructure User Guide," Computer Science 256–80, California Institute of Technology, Pasadena, California, Version 1.0, Jan. 23, 1998.

* cited by examiner

Primary Examiner—Meng-Al T. An
Assistant Examiner—LeChi Truong
(74) Attorney, Agent, or Firm—Fish & Richardson P.C.

(57) ABSTRACT

A distributed system framework and a distributed system architecture that includes three features: it can accommodate a large number of addressable entities, it is possible to connect any arbitrary group of entities together into a virtual network, and the infrastructure supports large numbers of concurrent virtual networks. In one aspect, the invention includes a distributed system framework for a networked environment, including a plurality of process objects, each process object including: a program method for creating at least one inbox for storing messages received from another process object; a program method for creating at least one outbox for storing messages to be transmitted to another process object; a freeze method that saves the state of the process object to persistent storage, thereby changing the process object to a frozen process object; a thaw method that restores the frozen process object from the persistent storage, thereby changing the frozen process object to a ready process object; a program method for interconnecting each created outbox of the process object to a created inbox of at least one other process object, thereby establishing a personal network between the process object and such other process objects within a communication session to perform at least one task by passing messages between the interconnected outboxes and in-boxes.

5 Claims, 3 Drawing Sheets

INFOSPHERES DISTRIBUTED OBJECT SYSTEM

CLAIM OF PRIORITY

This application claims priority under 35 USC §119(e) to U.S. Patent Application Ser. No. 60/082,475, filed Apr. 21, 1998.

STATEMENT AS TO FEDERALLY SPONSORED RESEARCH

This invention was made with Government support under Grant No. F4920-94-1-0244 awarded by the AFOSR, Grant No. CCR-9120008 awarded by the NSF, and Grant No. CCR-9527130 awarded by the NSF. The Government has certain rights in the invention.

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

This invention relates to computation and communication architectures, and more particularly to a distributed system framework and a distributed system architecture that provides for distributed applications that use worldwide networks connecting large numbers of people, software tools, monitoring instruments, and control devices.

BACKGROUND

Frameworks are reusable designs for software system processes, described by the combination of a set of objects and the way those objects can be used. More particularly, frameworks are pre-built sets of code, tools, and documentation that help programmers develop reliable systems more easily than from scratch. Following are some types of known frameworks.

Metacomputing frameworks use the Internet as a resource for concurrent computations. For example, Globus provides the infrastructure to create networked virtual supercomputers for running applications. Similarly, NPAC at Syracuse seeks to perform High Performance Computing and Communications (HPCC) activities using a Web-enabled concurrent virtual machine. Javelin is a Java-based architecture for writing parallel programs, implemented over Internet hosts, clients, and brokers. Legion is a C language based architecture and object model for providing the illusion of a single virtual machine to users for wide-area parallel processing. Javelin is a Java-based architecture for writing parallel programs, implemented over Internet hosts, clients, and brokers.

Component frameworks have the goal of creating distributed system components. CORBA is an architecture for distributed object computing that allows for language-independent use of components through a standardized Object Request Broker. The ADAPTIVE Communication Environment (ACE) provides an integrated framework of reusable C language wrappers and components that perform common communications software tasks; this framework is amenable to a design pattern group useful to many object-oriented communication systems. Hector is a Python-based distributed object framework that provides a communications transparency layer enabling negotiation of communication protocol qualities, comprehensive support services for application objects, and a four-tiered architecture for interaction. Aglets provide a Java-based framework for secure Internet agents that are mobile, moving state along with the program components themselves. OpenDoc is a component software architecture that allows for the creation of compound documents. JavaBeans is a platform-neutral API and architecture for the creation and use of Java components.

Communication frameworks relate to concurrent communication of processes. The Communicating Sequential Processes (CSP) model assumes each process is active for the entire duration of the computation. Examples include Fortran M and recent ORB services. One ORB service is the CORBA process model, implemented using the Basic Object Adaptor (BOA) of a given Object Request Broker (ORB), which maintains that only the broker stay active for the entire duration of the computation. Like Client-Server, Remote Procedure Call, and Remote Method Invocation systems, CORBA only spawns remote processes to perform isolated remote tasks.

Collaborative Technologies allow collaboration using the Internet. Synchronous collaboration includes teleconferencing, provided by applications such as Netscape CoolTalk, Internet Relay Chat, Internet Phone, and White Pine Software CU-SeeMe, and shared whiteboards, provided in applications such as CU-SeeMe, wb, and Microsoft NetMeeting. Current agreement protocols has made synchronous collaborations more flexible, but much research remains to be done in infrastructure for asynchronous tools such as concurrent version-control.

The Open Software Foundation's Distributed Computing Environment (DCE) is an example of a commercial distributed system framework. DCE provides a suite of tools and services to support distributed system creation primarily in the C programming language. These services include a distributed file system, time synchronization, remote procedure calls, naming, and threads.

SUMMARY

The present invention includes a distributed system framework and a distributed system architecture that includes three features: it can accommodate a large number of addressable entities, it is possible to connect any arbitrary group of entities together into a virtual network, and the infrastructure supports large numbers of concurrent virtual networks.

In one aspect, the invention includes a distributed system framework for a networked environment, including a plurality of process objects, each process object including: a program method for creating at least one inbox for storing messages received from another process object; a program method for creating at least one outbox for storing messages to be transmitted to another process object; a freeze method that saves the state of the process object to persistent storage, thereby changing the process object to a frozen process object; a thaw method that restores the frozen process object from the persistent storage, thereby changing the frozen process object to a ready process object; a program method for interconnecting each created outbox of the process object to a created inbox of at least one other process object, thereby establishing a personal network between the process object and such other process objects within a communication session to perform at least one task by passing messages between the interconnected outboxes and inboxes.

The preferred embodiment of the invention provides:

a generic object model;

a variety of messaging models, including asynchronous, synchronous, and remote procedure/method calls; and a variety of distributed system services, including local and global naming, object instance control, object persistence, and dynamic object extensibility.

Using these tools, a developer can build robust distributed systems on the Internet. Furthermore, the ideas, algorithms, and theories developed within this framework are directly applicable to existing distributed systems and frameworks. In a preferred embodiment, the framework is written in Java, allowing cross-platform development.

Distributed systems in the future could potentially span the globe, subsuming every hardware and software resource on the Internet. We term this global distributed system the Worldwide Object Network (WON). The objects participating in such a system may be supporting hand-held devices, home appliances, scientific instruments, or software tools. Systems that benefit from a distributed system architecture include:

Electronic Mail (source-initiated information transmission);

Domain Name Service (hierarchical, cached, client-pull/server-push based naming across geographic regions);

World Wide Web (semi-structured on-demand information);

Technical Report Archive (enterprise document management); and

Automated Bank Tellers (centralized database access, distributed transactions, electronic commerce).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Introduction

Figure 1:
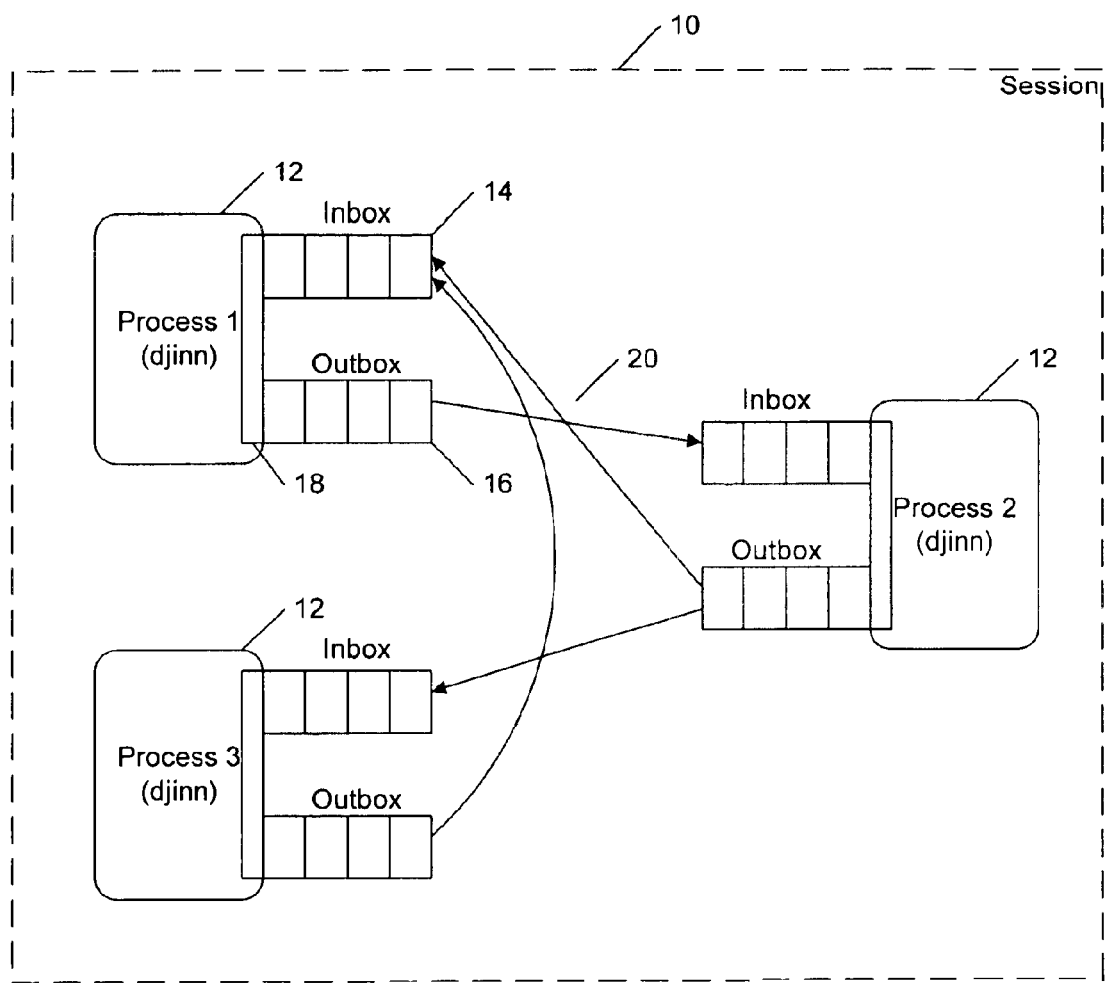
FIG. 1 is a block diagram showing the infosphere framework of the present invention.

Millions of people use the World-Wide Web for information exchange and for client-server applications. Widespread use has led to the development of a cottage industry for producing Web-based documentation; large numbers of people without formal education in computing are developing server applications on the Web. This invention extends this infrastructure to a distributed system with peer-to-peer process communication across the Global Information Infrastructure (GII). Aspects of the invention include a framework of reusable designs for software system processes, software components that can be composed to create distributed applications, implementation of software components as classes in an object-oriented framework, development of a compositional methodology for constructing correct distributed applications from the components, and implementation of a library of applications that demonstrates the methodology.

A Framework for Structured Distributed Object Computing

The invention includes a framework for a distributed system that implements distributed applications over worldwide networks connecting large numbers of people, software tools, monitoring instruments, and control devices.

Frameworks are reusable designs for software system processes, described by the combination of a set of objects and the way those objects can be used. The framework of the present invention consists of middleware APIs, a model for using them, and services and patterns that are helpful not only in inheriting from objects, but extending them as well. These features allow the reuse of both design and code, reducing the effort required to develop an application.

A distributed system is a set of cooperating entities that run in logically different memory locations. In general, distributed systems have geographically scattered components. However, a single computer can be a distributed system if it can run multiple processes that communicate using interprocess communication (IPC) mechanisms like sockets. Distributed systems are often prototyped on single-processor machines, which give a programmer a high degree of control over system conditions.

Distributed systems can be client-server or peer-to-peer. In client-server systems, one or more clients connect to one or more servers and request data. For example, in the World Wide Web, the servers provide the information in the form of Web pages, and the clients are browsers that display that information in a meaningful way. By contrast, in peer-to-peer systems, all programs in the system can behave as both clients and servers, able both to deliver and manipulate data. With the present invention, developers can create both client-server and peer-to-peer systems.

Objects are groups of data with associated methods to query and modify that data. Objects have the three primary properties: encapsulation, polymorphism, and inheritance. A distributed object is an object that can communicate across a network with other objects, through remote method calls or message passing. Objects can be single threaded or multithreaded. Some systems permit objects to maintain state across instantiations. Distributed objects extend the ideas of encapsulation, inheritance, and polymorphism.

Encapsulation. Encapsulation allows an object to have an exposed interface to the outside world, with a complementary private implementation that conforms to that interface. In a distributed system, any object that implements a given interface can be replaced with any other object that implements the same interface.

With distributed object systems, encapsulation is extended. First, an object's state is fully encapsulated from the outside world, so that the only way an object A can cause a change in the state of another object B is for A to communicate with B by sending a message to B or calling a method on B. A thread in one object cannot refer to, have a reference for, or modify, the state of any other object. Second, encapsulation in distributed systems allows location transparency. An object can have a reference to a remote object with which it can communicate, but it does not need to know the actual physical location of that object.

Inheritance. Generally, inheritance allows a developer to construct a new object from the interfaces and implementations of existing objects. A "child" object inherits from one or more "parent" objects, through class inheritance and/or type inheritance. With class inheritance, implementations are inherited, so that the behavior of a child object defaults to the parent object behavior if it is not overridden. With type inheritance, interfaces are inherited, so that "subtypes" of a parent type are contractually bound to implement the parent's interface, but do not necessarily reuse their parent's code.

Notions of class and type inheritance still hold for distributed objects, though there are new issues that need be taken into account. One such issue is method invocation overhead (due to network latency and bandwidth); if a delegation model is used, one must take into account the fact that each additional method call, unless optimized or short-circuited, bumps the delay in response significantly due to network issues. Three more factors that come into play when dealing with distributed object inheritance are scoping issues (note the scoping rules for Java, for instance, and how they differ from C++), engineering practices (the implied "super" in constructors, for instance), and lack of awareness of locality (in dealing with network errors for method invocations and the like).

Polymorphism. Polymorphism allows an object to specify an interface that can handle multiple types, reacting accordingly to different types and values. A system that has multiple objects responding to the same message—based on its type and value—is analogous to a polymorphic system.

In distributed object systems, the concept of polymorphism extends to the network interface. An object receives and responds to messages, which are normally objects themselves, of various types in exactly the same manner that local objects respond to method calls with parameters of various types. In addition, multiple distributed objects of different (though usually related) types can receive and respond to messages of the same type, acting polymorphic with respect to the message's network interface.

Personal Command and Control Applications

The GII will soon connect large numbers of processes that manage devices and human interfaces. Interprocess communication will allow processes to respond to events on such devices as medical monitoring equipment, scientific instruments, home appliances, and security systems, and on such software as scheduling programs, document management systems, Web browsers, and complex computation engines.

A major contribution of the present invention is a simple, generic framework for developing distributed systems for personal applications. By employing this framework, developers can quickly build interactive command and control processes that run over the Internet. Our framework is composed of at least four facets: (1) processes are persistent communicating objects (we coin the phrase djinn to distinguish a process used in a collaborative distributed application from processes used in traditional distributed systems); (2) personal networks provide wiring diagrams and behaviors for these connected processes, and enable long-term collaborations between people or groups; (3) sessions are transactions performed by the processes participating in a personal network; more particularly, a session is a temporary network of djinns that carries out a task such as arranging a meeting time for a group of people; and (4) infospheres are custom collections of processes for use in personal networks.

FIG. 1 is a block diagram showing the infosphere framework of the present invention, described in greater detail below. A session 10 includes a plurality of processes 12, each having an inbox 14 and an outbox 16 controlled by a maildaemon object 18. Various processes 12 are interconnected by means of their inboxes 14 and outboxes 16 to form a temporary personal network 20.

Infospheres and Personal Networks "Warfighter's infosphere" is a term coined by the military to represent the electronic interface between a military unit and its environment. An infosphere includes the collection of instruments, appliances, computing tools, services, and people accessible from that person's environment, wherever it may be physically located (for example, in the office or on an airplane). This human-computer interface is provided by the military C4I (command, control, communications, computers, and intelligence) infrastructure.

Our goal is to provide a framework for transitioning the concepts of infospheres and C41 to individuals and small organizations to create analogous lightweight command and control systems. Personal networks are roadmaps for such systems, specifying processes arranged in a topology, with a specified cooperative behavior. For example, a person in Nevada may have an emergency notification personal network that incorporates processes for medical monitoring devices in her parents' home in Florida, security and utility systems in her home and car in New York, a global position sensing device on her teenage son's car in Montréal, a Nikkei Market stock ticker tape, and software programs that monitor urgent pages and e-mails.

Personal networks can also be used by institutions and businesses to create taskforces to handle short-term situations. The structure of personal networks comprises the organizational, informational, and workflow structures of the corresponding task force. Workflow describes the manner in which jobs are processed in stages by different processes.

One example of a task force is a panel that reviews proposals submitted to the National Science Foundation (NSF). Panel members come from a variety of institutions, and the panel has an organizational structure with a general chair, subcommittees, primary reviewers, and secondary reviewers. The panel's informational structure includes the hierarchy of proposals and reviews, and the panel's workflow is the flow of proposal and review copies. The panel has its own organizational, informational, and workflow structures that coexist with those of NSF. In this sense, NSF's organizational and informational structures adapt in a dynamic, but systematic, way to include new people and resources as needed.

Framework Functional Criteria

A framework to support personal networks (and their components) should satisfy four main criteria: scalability, simplicity, security, and adaptability.

Scalability. Personal networks should scale to include devices, tools, and people connected to the Internet. The critical scaling issue is not the number of processes connected in a personal network, but rather the size of the pool from which the processes in personal networks are drawn. The only limit to the number of processes connected in a personal network is the number of activities that can be managed effectively. However, issues of scaling in naming, connections, and services depend on the size of the global set of processes and resources.

Personal networks should be tolerant of wide ranges of quality of service because the processes in a personal network can exist on a single system or span several continents. The framework should both support large numbers of concurrent personal networks and provide a core set of services for creating and using personal networks.

Simplicity. The usage and programming model for personal networks should be simple enough to be usable by anyone. The simplicity of dialing a telephone led to the widespread use of telephones despite the complexity of the worldwide telecommunications network. If personal networks are to become effective tools, their use should be similarly intuitive. So, the model's API (Application Program Interface) should be easy for programmers to learn quickly, and the accompanying visual tools should allow non-programmers to use palettes of existing constructs to customize their personal networks.

Security. The framework should allow processes to have multiple typed interfaces and provide the ability to set security restrictions on at least a per-interface basis. For example, a research instrument shared by several people may have one interface for setting control parameters and a different interface, accessible by a small set of authorized personnel, for accessing the data recorded by the instrument. Also, instruction messages sent to the "modify-parameter" interface may be of a different type than instructions to the "read-data" interface.

Adaptability. The framework should be extensible enough to support interoperability with other distributed technologies. Thus, it should be possible to create and modify personal networks rapidly and flexibly, because task forces often need to be set up quickly and in an ad hoc manner. Network topologies should be emergent rather than static, so processes should be able to create and delete connections during a session. Additionally, personal network processes should be able to communicate with applications and devices that were unknown or nonexistent prior to the creation of the personal network.

Preferred Design of an Extensible Framework

Our framework employs three structuring mechanisms for processes: personal networks, to facilitate long-term collaborations between people or groups; sessions, to provide a mechanism for carrying out the short-term tasks necessary within these personal networks; and infospheres, to allow customization of processes and personal networks. Infospheres are discussed below. This section focuses on the conceptual models for processes, personal networks, and sessions.

To illustrate these structuring mechanisms, consider a consortium of institutions carrying out research on a common problem. It has a personal network composed of processes that belong to the infospheres of the consortium members. This personal network is a structured way to manage the collection of resources, processes, and communication channels used in distributed tasks such as simulating financial scenarios, determining meeting times, and querying distributed databases. Each session of this personal network handles the acquisition, use, and release of resources, processes, and channels for the life of a specific task.

Conceptual Model: Processes

Processes are the persistent communicating objects that manage devices and interfaces. Every object, whether active or stored, has a unique name. In the initial implementation of our framework, we call these processes djinns. Processes or djinns are uniquely named; can be persistent; can be multi-threaded; can interoperate with other programs, services, and infrastructures; and can find and connect to these other services automatically. Djinns communicate asynchronously using messages sent between mailboxes. A djinn's mailboxes are message queues that are handled and processed by the djinn's maildaemon object or thread. These communication mechanisms, including mailboxes and messages, and djinns are described below.

Djinns make infospheres constructible: thus, as used herein, an infosphere is a personal collection of related djinns that are applied by a person to accomplish a particular task.

Process States. A given process can be in one of three states: active, waiting, and frozen. An active process is a process that has at least one executing thread; it can change its state and perform any tasks it has pending, including communications. A waiting process has no executing threads; its state remains unchanged while it is waiting, and it remains in the waiting state until one of a specified set of input ports becomes nonempty, at which point it becomes active and resumes execution. Active and waiting processes are collectively referred to as a ready process.

Ready processes occupy process slots and can make use of other resources provided by the operating system. In contrast, processes in the third state, frozen, do not occupy process slots. In fact, frozen processes do not use any operating system resources except for the persistent storage, such as a file or a database, that is used to maintain process state information.

Freezing, Summoning, and Thawing Processes. Associated with each process is a freeze method, that saves the state of the process to a persistent store, and a thaw method, that restores the process state from the store. Typical processes remain in the frozen state nearly all the time, and therefore require minimal resources. In the preferred embodiment of our framework, only a waiting process can be frozen, and it can only be frozen at process-specified points. When its freeze method is invoked, a process yields all the system resources it holds except for its persistent store.

A ready process can summon another process. If a process is frozen when it is summoned, the act of summoning instantiates the frozen process, causes its thaw method to be invoked, and initiates a transition to the ready state. If a process is ready when it is summoned, it remains ready. In either case, a summoned process remains ready until it receives at least one message from its summoner or a specified timeout interval elapses.

Mobile Processes. Frozen processes can migrate from one machine to another, but ready processes cannot. This restriction allows ready processes to communicate using our framework's underlying fast transport layer, which requires static addresses for communication resources. All processes have a permanent "home address" from which a summons can be forwarded. Once a process becomes ready at a given location, it remains at that location until the process is next frozen. While a particular process may be instantiated at any location, its persistent state is always stored at the home address of that process.

Conceptual Model: Personal Networks

Conceptually, a personal network is a wiring diagram, analogous to a home entertainment system, with directed wires connecting device outputs to the inputs of other devices. We chose this model for its simplicity. More particularly, a personal network consists of an arrangement of processes (distributed objects) and a set of directed, typed, secure communication channels connecting process output ports to the input ports of other processes. The topology of a personal network can be represented by a labeled directed graph, where each node is a process and each edge is a communication channel labeled with its type and the input and output ports or mailboxes connected by that channel. Note that, unlike home entertainment system components, processes can freely create input ports, create output ports, and change wire connections or channels. A personal network is created when the collaboration is requested and is deleted when the collaboration terminates.

Communication Structures. Processes communicate with each other by passing messages. Associated with each process is a set of inboxes and a set of outboxes. Inboxes and outboxes are collectively called mailboxes. Every mailbox has a type and an access control list, both of which are used to enforce personal network structure and security. These mailboxes correspond to the device inputs and outputs used in the wiring diagram conceptual model.

A connection is a first-in-first-out, directed, secure, error-free broadcast channel from the outbox to each connected inbox. Process interconnections are asymmetric: a process can connect any of its outboxes to any set of inboxes for which it has references, but cannot construct a connection from an outbox belonging to another process to any of its inboxes. Our framework contains support for message prioritization, available through standard multithreading techniques.

Message Delivery. Our framework communication layer works by removing the message at the head of a nonempty outbox of a process and appending a copy of that message to each connected inbox of other processes. If the communication layer cannot deliver a message, an exception is raised in the sender process containing the message, the destination inbox, and the specific error condition. The preferred system uses a sliding window protocol to manage the messages in transit.

Every message at the head of an outbox will eventually be handled by the communication layer. The preferred embodiment of the invention uses asynchronous messages rather than remote procedure calls, to be tolerant of the range of message delays experienced along different links of the Internet. As a result, we can think about message delivery from an outbox to inboxes as a simple synchronous operation even though the actual implementation is asynchronous and complex.

Dynamic Structures. A process can create, delete, and change mailboxes in addition to being able to create and delete connections between its outboxes and other processes' inboxes. The operation of creating a mailbox returns a global reference to that mailbox. This reference can then be passed, in messages, to other processes. Since a process can change its connections and mailboxes, the topology of a personal network can evolve over time as required to perform new tasks.

As long as a process remains ready, references to its mailboxes are valid; when a process is frozen, all references to its mailboxes become invalid. Since all references to the mailboxes of frozen processes are invalid, frozen processes can move and then be thawed, at which point the references to their mailboxes need be refreshed via a summons. Because no valid references to their mailboxes exist, frozen processes cannot participate in sessions.

Conceptual Model: Sessions

Operationally, a session is a task carried out by (the processes in) a personal network. From another point of view, a session can be viewed as a generic transaction between a set of distributed active objects where the participants in the transaction are not identified before the transaction commences. A session is initiated by a process in the personal network, and is completed when the task has been accomplished. A later session may use the same processes to carry out another task. Thus, a personal network consists of a group of processes in a specified topology, interacting in sessions to perform tasks. Djinns are composed together to form distributed sessions. Sessions need not be static; after initiation, they may grow and shrink as required by the djinns.

A session is specified in terms of the precondition and postcondition predicates of its component processes, thus reasoning on sessions is possible. Sessions can be composed using sequential and choice composition, and the system can reason about sessions using theory from the field of sequential programming.

The Session Constraint. We adopt the convention that sessions must satisfy a two-part session constraint which ensures that, during a session, information flows correctly between processes:

1. As long as any process within the session holds a reference to a mailbox belonging to another process within the session, that reference must remain valid.
2. A mailbox's access control list (ACL) cannot be constricted as long as any other process in the session holds a reference to that mailbox.

An important corollary to the session constraint is that frozen processes cannot participate in sessions because no valid references to their mailboxes exist.

A session is usually started by the process initially charged with accomplishing a task. This initiator process creates a session by summoning the processes that will initially participate. It then obtains references to their mailboxes, passes these references to the other processes, and makes the appropriate connections of its outboxes to the inboxes of the participating processes. We discuss session implementation and reasoning issues below.

There are many ways of satisfying the session constraint. One simple way is to ensure that once a process participates in a session it remains ready until the session terminates, and that once a process sends its mailbox references to other processes it leaves these mailboxes unchanged for the duration of the session. Another approach is to have the initiating process detect the completion of the task through a diffusing computation, after which it can inform the other session members that the session can be disbanded.

An Example Session. An example of a session is the task of determining an acceptable meeting time and place for a quorum of committee members. Each committee member has an infosphere containing a calendar process that manages his or her appointments. A personal network describes the topology of these calendar processes. A session initiator process sets up the network connections of this personal network. The processes negotiate to find an acceptable meeting time or to determine that no suitable time exists. The task completes, the session ends, and the processes freeze. Note that the framework does not require that processes freeze when the session terminates (but that this will usually be the case).

During a session, the processes must receive the quality of service they need to accomplish their task. Therefore, it is greatly preferred that communication is routed directly from process to process, rather than through object request brokers or intermediate processes as in client-server systems. Once a session is constructed, our framework's only communication role is to choose the appropriate protocols and channels. A session can negotiate with the underlying communication layer to use the most appropriate process-to-process mechanism. A current embodiment of the inventive framework supports only UDP (User Datagram Protocol), but it is possible to support a range of protocols such as TCP (Transmission Control Protocol) and communication layers such as Globus.

Structuring Mechanisms

Personal networks and sessions can be used not only as structuring mechanisms, but also for reasoning about the services provided to distributed systems.

Reasoning About Sessions. Consider a consortium of institutions working together on a research project. From time to time, people and resources of the consortium carry out a collaborative task by initiating a session, setting up connections using the personal network, performing the necessary machinations for the task, disbanding the connections, and terminating the session. Furthermore, several sessions initiated by the same consortium may be executing at the same time. For instance, a session to determine a meeting time for the executive committee and a session that reads measurements from devices in order to carry out a distributed computation could execute simultaneously. Moreover, the same process may participate concurrently in sessions initiated by different consortia or task forces. For example, a calendar manager may participate concurrently in sessions determining meeting times for a scout troop and a conference program committee. Our framework allows processes to participate in concurrent sessions.

A resource may be requested by a session in either exclusive mode or nonexclusive mode. For example, a visualization engine may need to be in exclusive mode for a task: while the task is executing, no other task can access it. However, a process managing a calendar can be useful in nonexclusive mode: several sessions can not only read the calendar concurrently, but also modify different parts of the calendar concurrently.

Because we cannot predict a priori the applications and sessions that will run concurrently, in the preferred embodiment, we restrict access to modify the states of the processes participating in a given session, to reason about that session's behavior. Such restrictions may be provided in thread libraries by mutexes and monitors; our invention provides similar constructs with our framework for use in distributed systems in a generic, extensible, and scalable manner.

Services for Sessions. New capabilities are added to our framework either by subclassing existing processes or by extending the framework. A service is a framework extension that is applicable to an assortment of distributed algorithms. Examples include mechanisms for locking, deadlock avoidance, termination detection, and resource reservation.

Locking Mechanisms. Even if a process participates concurrently in several sessions, there are points in a computation when one session needs exclusive access to certain objects. For example, at some point, the session determining the meeting time for a program committee needs to obtain exclusive access to the relevant portions of the calendars of all the committee members. Therefore, one service that the preferred embodiment of the invention framework provides is the acquisition of locks on distributed objects accessed during a session. A great deal of work exists relating to locking in distributed databases and distributed transaction systems. Presently, the preferred embodiment provides only an exclusive lock on an object, but the framework can be extended to include other types of locks, such as read and write locks, in accordance with known techniques.

Deadlock Avoidance. If sessions lock objects in an incremental fashion, deadlock can occur. For instance, if one session locks object A and then object B, and another session locks B and then A, the sessions may deadlock because each session holds one object while waiting for the other. The preferred embodiment deals only with the case where a session requests locks on a set of objects only when it holds no locks; a session must release all locks that it holds before requesting locks on a different set of processes. An alternative solution would be to allow incremental locking in some total ordering, but this solution has some drawbacks because it does not scale to distributed systems drawn from a worldwide pool of objects.

Termination Detection and Resource Reservation. Other services that can be extended into our framework include session termination detection and resource reservation. Termination detection can be used by an initiating process of a session to, for instance, determine when the states of the processes involved in the session need to be "rolled back" in the event of a failure. Resource reservation is a generic service through which the resources required by a session can be reserved for some time in the future. For instance, one might reserve a visualization engine at location X and a monitoring instrument at location Y for the earliest time after 5:00 PM today. Techniques for implementing these functions are well known.

Collaboration Patterns. Patterns help programmers develop code quickly. Patterns encapsulate software solutions to common problems, and our framework has incorporated some applications of concurrency patterns in Java. Initial experience with our framework has suggested several patterns, both for collaborations between processes and for state-transition systems.

In particular, several patterns of collaboration network topologies have emerged from our exploration of personal networks. A personal network consisting of a "master" process maintaining all modifications to an object shared by the other objects of the personal network fits a Personal Network Star pattern. For example, a concurrent document editing system with a single process responsible for maintaining changes during a personal network would match this pattern. This pattern roughly corresponds to a system with a single server with a set of clients, though more sophisticated systems (such as a hierarchy with multiple servers and multiple clients) could also be developed.

A personal network in which each of the processes collaborate without a master, with all modifications announced to the entire group, fits a Personal Network Full Connection pattern. For example, a concurrent document editing system in which every process sends every modification to every other process, and every process is responsible for updating the local view of the shared object, would match this pattern. This pattern roughly corresponds to a peer-to-peer distributed system, though more sophisticated systems (such as different priorities for different peers) could also be developed.

A personal network in which messages are propagated in a ring during collaboration fits the Personal Network Ring pattern. For example, a document editing system in which the session-initiator process has a document and makes changes to it, then sends the modified document to the next process for it to make changes, and so on until the document is returned to the session-initiator process, would match this pattern. This pattern roughly corresponds to a workflow distributed system, though more elaborate workflow templates could also be developed.

Other middleware patterns may be used as well, such as hierarchical broadcast using publishing and subscribing processes, and dataflow using waiting and notification processes.

State-Transition System Patterns. In addition to collaboration patterns among the processes in a personal network, our experiences with user interfaces for describing network topologies has given rise to a pair of state-transition system patterns. Using these patterns, developers can design and reason about the changes of state in the processes participating in a session.

One pattern is the Transition on Modes pattern, in which the processes change their states based on a combination of their respective modes and the messages they receive on their inboxes. For example, in a distributed accounting system, a money receipt message would cause different ledgers to be modified, based on whether the controlling process was in "accounts receivable" or "accounts payable" mode.

Another pattern is the Transition on Functions pattern, in which the processes change their states based on a function of the information contained within the messages they receive on their inboxes. For example, in a distributed accounting system, an income transfer may require different actions based on how much money is being transferred, for tax shelter purposes.

Framework Implementation

One embodiment of our tools and models is classified in the "white box framework" level of the taxonomy given by the framework pattern language. With the addition of more applications, services, visual builders, and language tools, we have developed a "black box framework." To guarantee widespread, unrestricted use, our initial implementation of a framework has been developed using Sun Microsystem's Java Developer's Kit (JDK) version 1.0.2, and uses Java socket classes and thread primitives. The initial implementation uses UDP, and it includes a layer to ensure that messages are delivered in the order they were sent. Although this implementation uses Java, the fundamental ideas apply to any object-oriented language that supports messaging and threads. The Infospheres source code and User Manual for the initial implementation of the invention is available at http://www.infospheres.con/releases/II.html, and both items are hereby incorporated by reference.

The initial framework can be optimized for JDK version 1.1 by taking advantage of the following newly standardized packages:

Remote Method Invocation (RMI) for a proxy-based distributed object model.

Object Serialization facilities for packing and unpacking objects and messages (both for communication and for persistent storage).

Java Database Connectivity support for persistent storage of, and queries on, process, state, and interface data.

Interface Definition Language (IDL) packages for interoperability with Common Object Request Broker Architecture (CORBA) distributed objects.

Security packages for communication encryption and process authentication.

Reflection packages for innovative structuring of emergent personal networks and process behavior.

Distributed Applications

Using the framework described above, distributed applications can be built by nonprogrammers and programmers alike. Following is a discussion of the preferred characteristics of such distributed applications.

Temporary Duration. In many collaborative applications, a distributed session is set up for a period of time, after which the session is discarded. For instance, calendar djinns of the executive committee are linked together into a djinn-network session, and after the djinns agree on a meeting date and time, the session is cancelled. Some distributed sessions may have longer duration. For instance, in the second example set forth below, the distributed session of participants in a system design lasts as long as the design.

Durations of distributed sessions in collaborative applications can vary widely. By contrast, traditional distributed systems such as command and control systems are semi-permanent. The software layer should support distributed sessions with wide variations in duration.

Persistent State Across Multiple Temporary Sessions. In the first example set forth below, the state of an executive committee member's appointments calendar must persist; an appointments calendar that disappears when an appointment is made has no value.

Different parts of the state may be accessed and modified by different distributed sessions. For instance, a distributed session to set up an executive committee meeting may have access to Mondays and Fridays on one user's calendar, but not to other days, and a distributed session to inform collaborators about the status of a document may have access to document information but not to the calendar.

The state of a process may be accessed and modified by multiple concurrent sessions. Each session (e.g., a calendar session or a document management session) only has access to portions of the state relevant to that session. The specification of a session must be independent of other sessions with which it may be executing concurrently. Two sessions must not be allowed to proceed concurrently if one modifies variables accessed by the other.

Accordingly, preferred embodiments should provide a distributed infrastructure that sets up sessions that modify the persistent states of their participants, allows a member to participate in concurrent sessions, and ensures that sessions that interfere with each other are not scheduled concurrently.

Composition of Services. A traditional distributed system is architected in a series of well-defined layers, with each layer providing services to the layer above it and using services of the layer below. For instance, a distributed database application employs services—e.g., checkpointing, deadlock detection, and transaction abortion—of the distributed operating system on which it runs.

A session also needs operating system services. The model of application development for sessions and djinns is, however, very different from that in traditional systems. We do not expect each djinn developer to also develop all the operating systems services—e.g., checkpointing, termination detection, and multiway synchronization—that an application needs. Accordingly, a preferred embodiment facilitates the development of a library of operating systems services (which we could call servlets) that djinn developers could use in their djinns, as needed.

Coping with a Varied Network Environment. Communication delays can vary widely. One process in a calendar application may be in Australia while two other processes are in the same building in Pasadena. The system must cope with these delays; in addition, the system must also cope with faults in the network such as undelivered messages.

Patterns of Collaboration. In distributed applications, it is more difficult to verify the correctness of the concurrent and distributed aspects than it is to verify the sequential programming aspects. The difficult parts of a distributed system design include the correct implementations of process creation, communication, and synchronization. However, we can ease the programmer's burden of writing correct distributed applications, if modifying one distributed application to obtain another one with the same patterns of communication and synchronization can be done by modifying only the sequential parts of the application while leaving the concurrent and distributed parts unchanged. Accordingly, a preferred embodiment should identify these patterns, include class libraries that encapsulate these patterns, and include a library of distributed applications that demonstrate how common collaboration patterns can be tailored to solve a specific problem by modifying the sequential components.

Distributed System Design

Example of Intended Use

A consortium of institutions forms a research center, and the executive committee of the center has members from its component institutions. The director of the center wants to pick a date and place for a meeting of the executive committee. Several known algorithms can be used to solve this problem.

Figure 2:
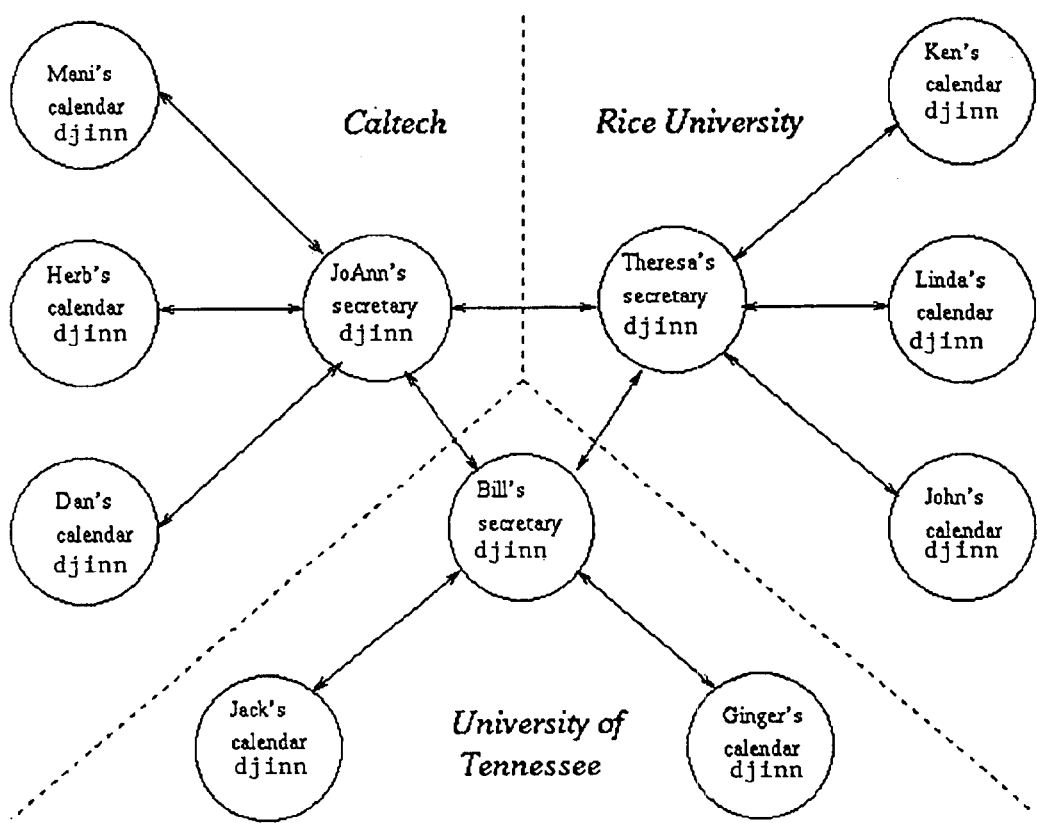
FIG. 2 is a data flow diagram showing a session of djinns for a particular example of one use of the invention.

The traditional approach has the director (or someone on the staff) call each member of the committee repeatedly, and negotiate with each one in turn until an agreement is reached. The approach we propose is to employ secretary and calendar processes—programs running concurrently on each committee member's desktop computer—to suggest a set of candidate dates that can then be approved or rejected by the members. FIG. 2 is a data flow diagram showing a session of djinns for this example.

Each member of the committee has a calendar process—a djinn—responsible for managing that member's calendar. A calendar djinn is a process: it operates in a single address space, it communicates with files by standard I/O operations, and it communicates with other processes through ports. Associated with each calendar djinn is an Internet address (i.e., IP address and port id). There may in addition be similar secretary djinns (as shown in FIG. 2), or possibly a coordinator djinn. The djinns are composed together into a temporary network of djinns that we call a session. The task of the session is to arrange a common meeting time. When this task is achieved, the session terminates. Note that each djinn is running on a different computer, and the arrowed lines represent communication between distributed processes over the Internet.

Figure 3:
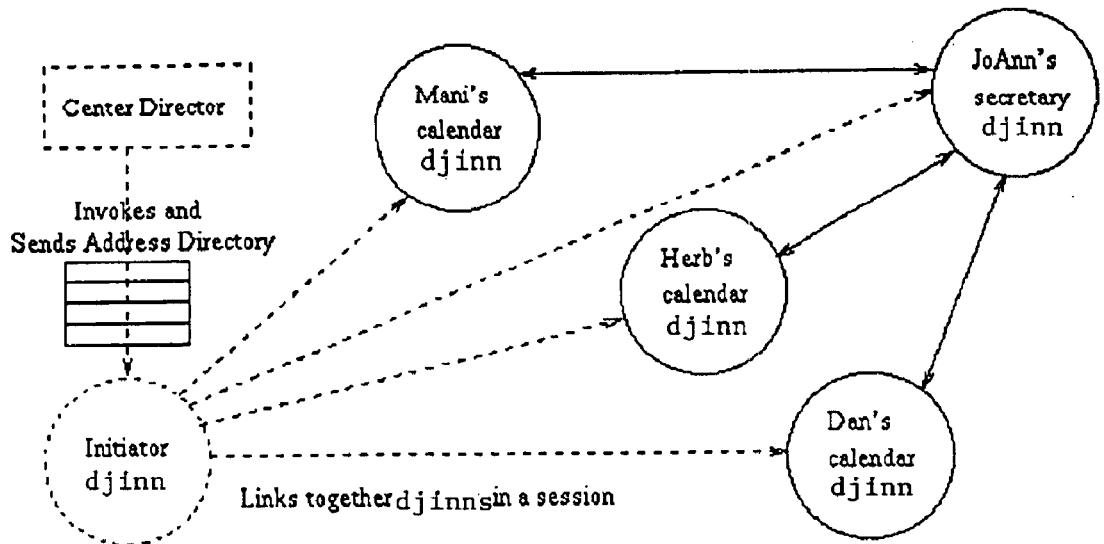
FIG. 3 is a data flow diagram showing how an initiator uses an invoker's address directory to set up a session between existing djinns.

Associated with each session is an initial process an initiator djinn—that is responsible for linking djinns together. FIG. 3 is a data flow diagram showing how an initiator uses an invoker's address directory to set up a session between existing djinns. In this example, the center director invokes an initiator djinn, and passes it a directory of addresses (e.g., Internet IP addresses and ports) of component djinns that are to be linked together into a session.

Djinn connections are achieved using the address directory. The initiator djinn sends a request to the component djinns; this request asks the components to link themselves up to form a session. For example, in our calendar session, each calendar user djinn may be linked to a common coordinating secretary djinn, as is done in FIG. 3. As another example, in a distributed card game session, a player djinn may be linked to its predecessor and successor player djinns (which correspond to the players to its left and right, respectively).

A djinn, on receiving a request to participate in a session, may accept the request and link itself up, or it may reject the request (because the requesting djinn was not on the receiving djinn's access control list, or because the receiving djinn is already participating in a session and another concurrent session would cause interference). When a session terminates, component djinns unlink themselves from each other.

Overall Distributed System Design

The following describes with more particularity the overall design of a distributed system that uses the framework described above, and highlights the software components we believe are useful for developing distributed applications. Our goal is to design a simple layer to support correct distributed application development; in the preferred embodiment, we employ Java features and Java classes to achieve this end.

Messages. Objects that are sent from one process to another are subclasses of a message class. An object that is sent by a process is converted into a string, sent across the network, and then reconstructed back into its original type by the receiving process. Java methods are used to convert an object to a string and to create an instance of the sending object at the receiver.

Inboxes, Outboxes, and Channels. Each process has a set of inboxes and a set of outboxes. Inboxes and outboxes are message queues. A process can append a message to the tail of one of its outboxes, and it can remove the message at the head of one of its inboxes. The methods that can be invoked on inbox and outbox objects are described later. Each inbox has a global address: the address of its djinn (i.e., its IP address and port) and a local reference within the djinn process.

Associated with each outbox is a set of inboxes to which the outbox is bound; there is a message channel from an outbox to each inbox to which it is bound. An example of a set of bound djinn inboxes and outboxes is given in FIG. 4. Each message channel is directed from exactly one outbox to exactly one inbox. Messages sent along a channel are delivered in the order sent. Message delays in channels are arbitrary.

Figure 4:
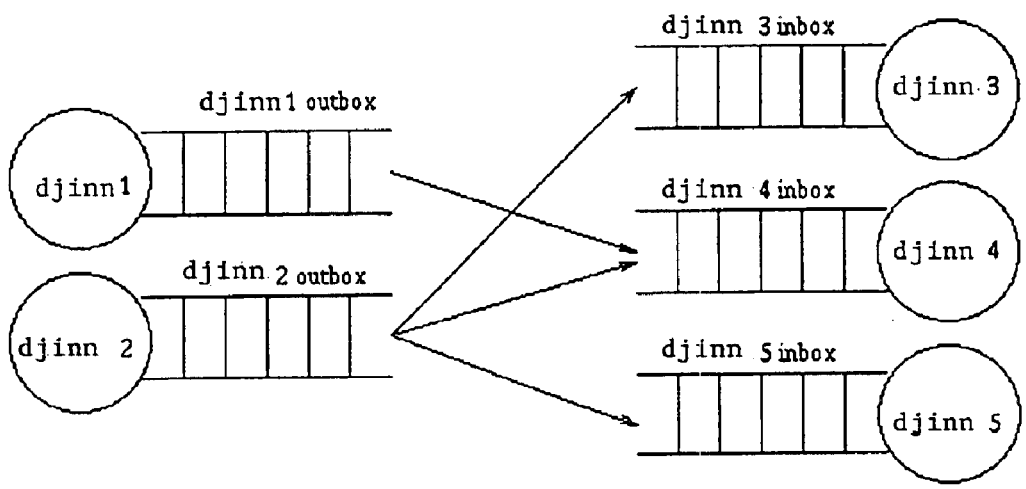
FIG. 4 is a block diagram showing an example of djinn inbox and outbox connections.

As shown in FIG. 4, an outbox can be bound to an arbitrary number of inboxes. Likewise, an inbox can be bound to an arbitrary number of outboxes. Therefore, there are an arbitrary number of outgoing channels from an outbox, and there are an arbitrary number of incoming channels to an inbox.

The distributed computing layer removes the message at the head of a nonempty outbox and sends a copy of the message along all channels connected to that outbox. The network layer delivers a message in a channel to the destination inbox of the channel. The delay incurred by a message on a channel is arbitrary; the delay is independent of the delay experienced by other messages on that channel, and it is independent of the delay on other channels. Also, if a message is not delivered within a specified time, an exception is raised.

In the preferred embodiment, each object has two special named inboxes: the exception inbox and the management inbox. An object can receive requests to connect itself to other objects through its management Inbox. A virtual personal network is created as follows: A singular object wishes to create a virtual network, this object is called the initiator of the virtual network. The initiator of a virtual network sends messages to the Management Inboxes of the collection of objects with which it needs to collaborate, requesting them to connect to other objects in the collection. After the initiator receives messages from all the objects in the collection that they have connected themselves, the initiator sends a start message to each object which then proceed with the computation. If the virtual network cannot be instantiated, an exception is raised at the initiator via its Exception Inbox which then takes appropriate action. A virtual personal network can be specified and instantiated graphically. After the collaboration is completed, the virtual network is deleted by having each object delete appropriate bindings of its outboxes and delete appropriate mailboxes (channel endpoints).

The duration of virtual personal networks vary; some need to be created very rapidly (within a fraction of a second), some are of medium duration (minutes to hours), and others persist for a very long time (months to years). An example of a virtual network that has to be created rapidly is a network that connects the objects of a soft real-time collaborative group of researchers. An example medium duration virtual network is a crisis management team. A long-term network might be a group of universities that are collaborating on a multi-year government grant.

Methods Invoked on Outboxes. An outbox has a data member inboxes, which is a list of addresses of inboxes to which the outbox is bound. In one embodiment, the application-layer methods that can be invoked on outboxes are:

1. add (ipa)—where ipa is the global address of an inbox; this method appends the specified inbox to the list inboxes if it is not already on the list. There is a directed FIFO channel from each outbox to each inbox to which it is bound.
2. delete(ipa)—removes the specified global address from the list inboxes if it is in the list, and otherwise throws an exception.
3. send(msg)—where msg belongs to a subclass of message; this method sends a copy of the object msg along each output channel connected to the outbox. If this message is not delivered within a specified time, an exception is raised.
4. destination( )—returns inboxes.

Methods Invoked on Inboxes. In the illustrated embodiment, the application-layer methods that can be invoked on inboxes are:

1. is Empty( )—returns true if the inbox is empty.
2. awaitNonEmpty( )—suspends execution until the inbox is nonempty.
3. receive( )—suspends execution until the inbox is nonempty and then returns the object at the head of the inbox, deleting the object from the inbox.

Strings as Names for Inboxes. As a convenience, we also allow each inbox to be addressed by a pair of identifiers: its unique djinn address (IP address and port), and a string in place of its local id. For instance, a professor djinn may have inboxes called "students" and "grades" in addition to inboxes to which no strings are attached. An outbox of a djinn can be bound to the "student" inbox of a professor djinn. The add and delete methods of a djinn are polymorphic: an inbox can be either specified by a global address (djinn address and local reference) or by a djinn address and string.

Communication Layer Features. Our simple communication layer, when used with objects and threads, can provide features present in more complex systems.

Some languages, such as C++, have a two-level hierarchy of address spaces: a global address space and a collection of local address spaces. So, pointers are of two kinds: global and local. A global pointer in one local address space can point to an object in any local address space. By contrast, a local pointer in a local address space can point only to objects in that local address space. Remote procedure calls (RPCs) on an object in a different local address space can be executed only if the invoker has a global reference to that object.

By contrast, in our implementation, all references are local, with the exception that djinns and inboxes have global addresses. An outbox in one djinn can bind to inboxes in other djinns. Addresses of inboxes and djinns can be communicated between djinns.

Global pointers and RPCs are implemented in our system in a straightforward way: Associate an inbox b with an object p. Messages in b are directions to invoke appropriate methods on p. Associate a thread with b and p; the thread receives a message from b, and then invokes the method specified in the message on p. Thus, the address of the inbox serves as a global pointer to an object associated with the inbox, and messages serve the role of asynchronous RPCs. Synchronous RPCs are implemented as pairwise asynchronous RPCs.

Inter-Djinn Services

We consider the problem of composing services with djinns. The challenge is to make these services generic so that they can be used for very different kinds of applications, and make the services powerful enough to simplify the design of djinns.

We focus our discussion here on inter-djinn services. In the preferred embodiment, methods for coordination within a djinn use standard Java classes. The questions we address are: How can objects associated with a service be bound into a djinn in a straightforward way, and, what sorts of services are helpful for djinn designers?

There are complementary ways of providing services to djinns. We can provide a collection of service objects that a designer can include in a djinn. In addition, we can have a resource manager process, executing on each machine, that provides a rich collection of services to djinns executing on that machine. Our focus in the preferred embodiment is on the former approach; we give a few examples of service objects and show how these services can be used within a djinn.

Tokens and Capabilities. In general, distributed operating systems manage indivisible resources shared by processes; we would like to provide service objects with this functionality, which a djinn designer can incorporate as needed. A problem is that generic service objects do not have information about the specific resources used in a given application.

Our solution is to treat indivisible resources in a generic way. The generic service deals with managing indivisible resources, sharing them among djinns in a way that avoids deadlock (if djinns release all resources before next requesting resources), and detecting deadlock if it does occur (if a djinn holds on to some resources and then requests more). The designer of a djinn can separate these service functions from other concerns, and using a library of common service functions can simplify djinn design.

We treat each resource as a token. Tokens are objects that are neither created nor destroyed; a fixed number of them are communicated and shared among the processes of a system. Tokens have colors; tokens of one color cannot be transmuted into tokens of another color. A token represents an indivisible resource, and a token color is a resource type. A file, for instance, is represented by a token and each file-token has a unique color.

A network of token-manager objects manages tokens shared by all the djiins in a session. A token is either held by a djinn or by the network of token managers. A token manager associated with a djinn has a data member, holdsTokens, which is the number of tokens of each color that the djinn holds.

In the preferred embodiment, a process can carry out the following operations on its token manager:

1. request (tokenList)—suspends until the requested tokens (i.e., a specified number for each color) is available, and then these tokens are removed from the token manager collection and given to the djinn (i.e., these tokens are added to holdsTokens). If the token managers detect a deadlock, an exception is raised. A specific positive number of tokens of a given color can be requested or the request can ask for all tokens of a given color.

2. release (tokenList)—releases the specified tokens from the djinn and returns them to the token managers; therefore, the specified tokens are decremented from holdsTokens and returned to the token managers. If the tokens specified in tokenList are not in holdsTokens, an exception is raised.

3. totalTokens( )—returns an array of the total number of tokens of all colors in the system.

The djinn that constructs the network of token managers ensures that the initial number of tokens is set appropriately. Tokens are defined by the invariant that the total number of tokens of each color in the system remains unchanged.

Tokens can be used in many ways. For example, suppose we want at most one process to modify an object at any point in the computation. We associate a single token with that object, and only the process holding the token can modify the object.

As another example, tokens can be used to implement a simple read/write control protocol that allows multiple concurrent reads of an object but at most one concurrent write (and no reads concurrent with a write) of the object. The object is associated with a token color. A djinn writes the object only if it has all tokens associated with the object, and a djinn reads the object only if it has at least one token associated with the object.

Clocks. Access to a global clock simplifies the design of many distributed algorithms. For instance, a global state can be easily checkpointed: all processes checkpoint their local states at some predetermined time T, and the states of the channels are the sequences of messages sent on the channels before T and received after T. Another use of global clocks is in distributed conflict resolution. Each request for a set of resources is timestamped with the time at which the request is made. Conflicts between two or more requests for a common indivisible resource are resolved in favor of the request with the earlier timestamp. Ties are broken in favor of the process with the lower ID value. If djinns release all resources before requesting resources, and release all resources within finite time, then all requests will be satisfied.

However, a problem is that djinns do not share a global clock. Though local clocks are quite accurate, they are not perfectly synchronized. We can, however, use unsynchronized clocks for checkpointing provided they satisfy the global snapshot criterion. The global snapshot criterion is satisfied provided every message that is sent when the sender's clock is T is received when the receiver's clock exceeds T. A simple algorithm to establish this criterion is: every message is timestamped with the sender's clock; upon receiving a message, if the receiver's clock value does not exceed the timestamp of the message, then the receiver's clock is set to a value greater than the timestamp. Further details of a preferred algorithm are set forth below.

Our message-passing layer is designed to provide local clocks that satisfy the global snapshot criterion. Our local clocks can be used for checkpointing and conflict resolution just as though they were global clocks. Djinn designers can separate the generic concerns of clock synchronization from other concerns specific to their application.

Synchronization Constructs. Java provides constructs for synchronizing threads within a djinn by using something like a monitor. We have implemented and verified other kinds of synchronization constructs—barriers, single-assignment variables, channels, and semaphores—for threads within a djinn. We are extending these designs to allow synchronizations between threads in different djinns in different address spaces.

Djinns

As noted above, a djinn is the fundamental component in the infospheres infrastructure of the present invention. Djinns are components in the classical sense: they are distributed applications of varying size that perform specific tasks by working in tandem with other distributed services, djinns, or other distributed objects. Djinns have well-defined interfaces that allow them to be accessed by other djinns, and can be extended through encapsulation and aggregation. Djinns may be written using the infospheres infrastructure packages in the Infospheres source code referenced above.

Djinns can be used to encapsulate a variety of services: simple C, C++, and Fortran processes, distributed CORBA and COM objects, object libraries and frameworks, legacy business applications written in older languages or systems such as COBOL and MVS, traditional DBMS and filesystems, and non-traditional arbitrary processes with deterministic interfaces. Djinns are primarily used to compose sessions.

In the preferred embodiment, djinns can be multi-threaded, persistent, and can migrate. Djinns preferably run in one of three "execution modes" (basically per instance, per object, and mutual exclusive modes), and can have visual interfaces so as to interact with a user.

Djinn Communication Layer

The generic djinn communication layer is based on asynchronous messages of arbitrary size and type. These messages are sent to and from djinns through the use of inboxes and outboxes, collectively known as mailboxes, as discussed above. The maildaemon is the object, unique to each djinn, that controls the flow of messages through the djinn's mailboxes. The maildaemon object routes incoming messages to the appropriate mailbox, and ships outgoing messages to the correct target djinn. The maildaemon ensures that all messages are ordered point-to-point, and that there is no duplication, loss, or corruption of any message.

One can exert a fine grain of control on mailboxes to provide typed message streams, message inheritance between mailbox types, or source-controlled routing of messages. Asynchronous messaging are the base communication mechanism of the Infospheres Infrastructure because it is a fundamental messaging construct. Other familiar mechanisms (like synchronous, typed, or high-throughput messaging and remote method calls) can be layered on top of this message mechanism.

Djinn Masters

The Djinn Master is responsible for the instantiation of, and the initial communication to, persistent djinns in a distributed application or session. The Djinn Master maintains a table of current djinns running; if a summon message is sent to a djinn that is not currently running (or does not currently exist), the appropriate djinn is thawed (or initiated) and executed, and the message is forwarded to the djinn. The Djinn Master is a djinn like any other. It can accept messages, service requests, and can be summoned.

This mechanism is similar to the BOA (Basic Object Adaptor) of CORBA. We provide three server models: that of server per request, that of persistent server per session, and that of a mutually exclusive server per session. Note that the Djinn Master is much more lightweight than a CORBA ORB and it is more flexible since it can initiate arbitrary processes whether or not they conform to the infospheres interface specification.

Archivable Distributed Components

Another aspect of the invention is the use of archivable distributed components to construct archivable webs of distributed asynchronous collaborations and experiments. A distinguishing feature of this approach is that the component tools, software, data, and even participants are distributed over a worldwide network. In describing this aspect of the invention, we present an algorithm for using the Infospheres Infrastructure described above to perform asynchronous global snapshots for archiving.

More particularly, we describe the design of a software technology that allows any component of a distributed system to (1) archive a "global snapshot" of the distributed system, (2) record events within components of the system, and (3) replay a distributed computation by resurrecting the system from an archived global snapshot and executing the archived events from the snapshot onward. An annotated collection of archived global snapshots, events, and documents can be linked into the World Wide Web automatically, allowing distributed systems to be restarted from their saved states, see these computations unfold, and follow the links to related computations.

The idea of archiving states and replaying events has been employed previously in such contexts as data backup, compiler analysis, and application debugging. Our contribution is that of archiving states and replaying events in distributed computations. Specifically, we consider systems composed of autonomous opaque objects with dynamic interfaces distributed across the Internet.

We begin by describing our vision of a web of archived distributed computations: first, we provide an overview of software component technology, and then we discuss some potential applications for the archival of computations in distributed component systems. Since component technology per se is not the focus of this discussion, we have restricted our discussion of it to the details relevant to the archival of distributed computations.

Component Technology

Component technology focuses on the representation and use of self-contained software packages which can be composed, or attached together, to create complete applications. Each component has an interface that specifies the compositional properties, and sometimes the behavior, of that component. Components can be composed either through static linking at compile time, or through dynamic linking over a network at run time. Our focus is on systematic composition of components that have dynamic interfaces and use asynchronous messages. There are several popular commercial component technologies, including CORBA, OpenDoc, ActiveX, and Java Beans.

Software component technology offers the potential for building new applications quickly and reliably. Rapid application development tools for creating component-based software are emerging. However, current component infrastructures are complex, requiring application developers to compose components at compile time using stubs and skeletons. Our focus is on dynamic composition of components at run time and methods for reasoning about the behavior of the resulting "collective" applications.

As an example of a collaboration-based distributed component system, imagine a group of researchers and observers working together on an experiment with several components:

data sets from databases in Houston and Syracuse;

a program composition tool at Caltech;

a CFD solver on a supercomputer at Argonne;

solid-mechanics simulators on a network of workstations at Los Alamos;

visualization engines in the offices of the researchers; and a classroom of students several weeks later, using standard web software to review the experiment and discuss it with their professor.

Opaque Distributed Software Components. An opaque (or "black box") component furnishes a programmer only with its interface specifications, not its actual implementation. The internal structure and behavior of an opaque component are completely hidden from other components. We assume that the components participating in a distributed collaboration of the type described above will be opaque, because it is unreasonable to require that users have access to the internal workings of the components they use.

The opacity of components implies that the procedure for archiving distributed state must itself be distributed. Since no component has access to the implementation of any other component, no single component can archive the state, or even a state description, of another component in the system. Therefore, each component must record its own state and archive it locally, and archived states of the entire system must be obtained by combining the locally archived states of the individual components.

Dynamic Interfaces and Dynamic Composition. Component interfaces can range in dynamism from completely static to completely dynamic. Most component systems with communication based on remote procedure calls (such as CORBA, Java RMI, and Microsoft COM and DCOM) support the use of static interfaces, which can be type checked at compile time. However, there are problems associated with the use of static interfaces in dynamic distributed environments. Components with dynamic interfaces can interact more successfully in such environments but, since the syntax of their interactions cannot be checked at compile time, the components must handle faulty communication links and unexpected interface changes at run time.

In the preferred embodiment, we prefer to use components with dynamic interfaces in a dynamic environment, although the central ideas relating to archiving distributed computations are applicable to components with static interfaces as well. The relevance of dynamic interfaces to the archival of distributed computations is that the state of a component must include its interface. For example, if the interface of a component is defined in terms of communication channels, and the number and types of those channels can change during a computation, then the archived state of the component must include information describing the channels in addition to any other information needed by the component.

Selecting Components from a Worldwide Pool. Ideally, users should be able to develop an application by using components selected from a worldwide pool. These components may be located at different sites, may be running on systems with various architectures and operating systems, and might have restricted availability.

Suppose, for instance, that an aeronautical engineer wants to do a multidisciplinary optimization experiment on airfoils. This experiment requires the composition of a solid mechanics computation dealing with vibrations and a fluid dynamics computation dealing with airflow. Many sites might offer a component that performs fluid dynamics computations, but these sites might differ in computation capability, access restrictions, and cost. The engineer should be able to select whichever component fits his needs, whether it is at Caltech, Los Alamos, or San Diego. Using the invention, it should be possible to develop an application by using components at different remote sites as easily as by using only local resources.

A worldwide pool of components is relevant to the archival of distributed computations because of scaling considerations. If all the components were located on an intranet serving a small, single-site campus, then a potential solution would be to take a global snapshot of the entire intranet. However, since the Internet has many autonomous units, such an approach is not feasible on a global scale. Also, the use of resources at multiple distributed sites raises issues of security, resource allocation, and privacy. Several known solutions to these problems exist, such as Java's sandbox model and ActiveX's code signing model.

Modes of Collaboration. There are two types of collaboration between groups of people using programs, control devices, and measuring instruments:

synchronous collaboration occurs when all components collaborate at the same time, usually requiring the continual presence of human beings.

asynchronous collaboration occurs when components can participate at different times over the course of a collaboration, only occasionally requiring the presence of human beings.

Teleconferencing and multi-user whiteboarding are examples of synchronous collaboration; these interactions are typically carried out by small groups of people for durations on the order of minutes to hours. A concurrent version-control system, with people working together on documents over extended periods of time, exemplifies asynchronous collaboration. In such a system, different annotated copies of documents flow through the system as individuals check in their work and update their workspaces. In this discussion, we consider methods of archiving distributed system states for asynchronous collaboration, though the ideas can be used in synchronous collaborations as well.

Infrastructure for Archiving Distributed Components

As discussed previously, an infrastructure to support distributed applications that can utilize archived states must support the composition of distributed opaque components with dynamic interfaces. These components must be able to participate in both synchronous and asynchronous collaborations. The infrastructure should assist in locating and composing components on the Internet. Finally, it should be possible to archive a distributed computation and resurrect it with reasonable use of resources, and these archived distributed computations should be linked into the Web in a manner similar to other documents. In particular, such an infrastructure should meet the following requirements.

Opaque Distributed Software Components. The only visible aspects of an opaque component are (1) its external interface, so that other components can connect, and (2) a specification of the component. In a distributed system, the interface is specified in terms of remote method invocations, object-request brokers, or messages. Each approach has advantages and disadvantages, but the specific form of the interface is less important than the fact that the component implementations are hidden. The infrastructure must support at least one of these methods of interface specification.

Dynamic Interfaces and Interactions. A component must be able to adapt to changing conditions in a computation. These include the addition of new components to the computation, temporary unavailability of communications resources, and other common situations which arise in Internet-based distributed systems. One way to deal with the dynamic environment is to allow a component to change its interface and connections to other components, during the course of a computation, so we require that the infrastructure allow component interfaces and interconnections to be completely dynamic.

Modes of Collaboration. All components participating in a synchronous collaboration must be active concurrently. By contrast, components participating in an asynchronous collaboration need not be active concurrently; any given component may be quiescent, becoming activated only when a communication arrives for it. The advantage of asynchronous collaboration is that the participating components need not hold resources concurrently, since they use resources only when they are computing. The disadvantage is that handling an incoming communication can be expensive, because the communication must be handled by a daemon that activates the quiescent component and then forwards the communication. Because of this tradeoff, we prefer that the infrastructure support both synchronous and asynchronous interactions, allowing individual component application developers to choose whichever mode is appropriate for their application.

Persistence. Components must be persistent, because a collaboration involving a set of components may last for years. Rather than forcing a component to stay active for the life of its collaborations, it is advantageous to design the component system such that the life cycle of a component is a sequence of active phases separated by quiescent phases. In such a system, when a component is quiescent, its state is serialized (and can, for example, be stored in a file) and the component uses no computing resources. When a component is active, it executes in a process slot or thread and listens for communications. Components designed in this way are often quiescent for most of their lifetimes, so the fact that quiescent components use no computing resources allows many more components to exist on the same machine than could possibly run simultaneously. The infrastructure must support the storage of persistent state information by individual components. In addition, it is desirable for the infrastructure to provide some method of efficiently updating persistent state information, such as by saving only incremental changes.

A World Wide Web of Archived Distributed Computations. Web technologies already provide the necessary mechanisms for linking archived distributed computations so that dynamic content representing the state of a component, or distributed experiment, or distributed computation can be viewed, hyperlinked, and indexed for searching. Users can take advantage of web browsers to read web pages and to follow links to archived information. The infrastructure must provide a way to generate such pages automatically, as well as a way to easily restart a distributed computation from its saved state (for example, by clicking on a link in a document).

Archiving Distributed States

We now describe an algorithm that can be used by the infrastructure described herein to archive distributed states. This is an improvement on the known "global snapshot" algorithm in which a clock, or sequence number, is stored with the snapshot state. (See K. M. Chandy and L. Lamport. Distributed snapshots: Determining the global states of distributed systems. ACM Transactions on Computing Systems, 3(1):63–75, February 1985). Within the snapshots, these logical clocks can be used for timestamping.

The Global Snapshot Algorithm. If all components recorded their complete states (including the states of their mailboxes) at a specified time T, then the collection of component states would be the state of the distributed system at time T. The problem is that the clocks of the components can drift, and even a small drift can cause problems. For example, two components P and Q share an indivisible token that they pass back and forth between them. P's clock is slightly faster than Q's clock. Both processes record their states when their clocks reach a predetermined time T. Assume that the token is at Q when P's clock reaches T, so P's recorded state shows that P does not have the token. Then, after Q has sent the token to P, Q's clock reaches time T. Q's recorded state then shows that Q does not have the token. Therefore, the recorded system state—the combined recorded states of P and Q that shows that no token is anywhere in the system—is erroneous. The basic problem arises because Q sends a message to P after P records its state but before Q records its state.

We describe our algorithm in terms of taking a single global snapshot. In practice, we will need to take a sequence of global snapshots, and extending the single snapshot algorithm to take sequences of snapshots is straightforward.

Initially, some component records its state; the mechanism that triggers this initial recording can be any desired event. For example, a component may record its state when its local clock gets to some predetermined time T, and the component with the clock that reaches T first is the first to record its state.

In the preferred embodiment, each message sent by a component is tagged with a single boolean variable which identifies the message as being either (1) sent before the component recorded its local state, or (2) sent after the component recorded its local state. In the preferred infrastructure, every message is acknowledged (i.e., an acknowledgment message is returned), so each acknowledgment is also tagged with a boolean variable indicating whether the acknowledgment was sent before or after the component recorded its state. When a message tagged as being sent after the sender recorded its state arrives at a receiver that has not recorded its state, the system causes the receiver's state to be recorded before delivering the message to the receiver. Acknowledgements are also tagged and are handled in the same way. Thus, the algorithm maintains the invariant that a message or acknowledgment sent after a component records its state is only delivered to components that have also recorded their states.

The issue of acknowledgments is somewhat subtle, so we describe it in more detail. Consider a component P sending a message m to a component Q. The message m is at the head of an outbox of P. The message-passing layer sends a copy of m to Q's inbox, to which P's outbox is connected. Note that m remains in P's outbox while the copy of m is in transit to Q's inbox. When the acknowledgment for m arrives at P, then and only then is message m discarded from P's outbox. If the acknowledgment is a post-recording acknowledgment, then P's state is recorded before the acknowledgment is delivered, and therefore P's state is recorded as still having message m in its outbox.

Repeated Snapshots. The algorithm for taking a single snapshot of an entire distributed system requires each component to have a boolean variable indicating whether that component has recorded its state. Also, each message and acknowledgment has a boolean variable indicating whether that message or acknowledgment was sent before or after the sender of that message or acknowledgment had recorded its state. For repeated snapshots, the boolean variable is replaced by a date represented by a sequence of integers for year, month, day, time in hours, minutes, seconds, milliseconds, and so on, to the appropriate granularity level. The date field of a component indicates when the component last recorded its state, and this date field is copied into messages and acknowledgments sent by the component. If a component receives a message or acknowledgment with a date that is later than its current date field, it takes a local snapshot, updates its date field to the date of the incoming message, and (if necessary) moves its clock forward to exceed the date of the incoming message.

Replaying a Distributed Computation. There is a distinction between having the saved state of a distributed computation and being able to replay the computation. An archived snapshot helps in a variety of ways but, because some distributed computations are nondeterministic, it does not guarantee that the distributed computation can be replayed.

In the preferred embodiment, the components are black boxes, so we cannot tell whether a component is deterministic. Re-executing the computation of a nondeterministic component from a saved state can result in a different computation, even though the component receives a sequence of messages identical to the sequence it received in the original computation. Replaying precisely the same sequence of events requires each component to execute events in exactly the same order as in the original sequence, so the replay has to be deterministic. For example, if there is a race condition in the original computation, then the replay must ensure that the race condition is won by the same event as in the original. Since components are black boxes, the inventive infrastructure cannot control events within a component. Therefore, the designers of the components must have a record-replay mechanism for recording the event that occurs in each nondeterministic situation and playing back this event correctly during replay.

During replay, the inventive infrastructure ensures that messages are delivered to a component in the same order as in the original computation, provided all components in the computation send the same sequences of messages. If the components have deterministic replay, the computation from the saved state will be an exact replay: a sequence of events identical to those of the original computation.

The inventive infrastructure guarantees that messages are delivered in the same order as in the original computation in the following way: a mail daemon executes on each computer that hosts components, logging the outbox, inbox and message ID for each incoming message. Because the contents of the messages are not necessary to properly deal with nondeterminism in the message-passing layer, they are not recorded by the mail daemon. During replay, the mail daemon holds messages that arrive in a different order, delivering them to the appropriate inboxes only after all previous messages in the original computation have been delivered.

A World Wide Web of Distributed Spaces

The existing Infospheres infrastructure supports saving the states of components and summoning components from these archived states to form new sessions. When a component is summoned from an archived state, it resumes computation from that state. It is convenient to treat each archived component as being unique; for instance, there may be a solid-mechanics computation component that is persistent (and, for practical purposes, lives forever), but an experimenter may have a sequence of related components corresponding to states of that component used at different times in different experiments. Our intent is to provide access to these archived components through a Web browser, using the standard summoning mechanism.

Comparison to Prior Work

Although our framework could be used for metacomputing applications, we prefer to provide mechanisms for programmers to develop distributed system components and personal networks quickly, and we plan to provide mechanisms for non-programmers to easily customize their components and personal networks. We differ from prior component frameworks because our emphasis is on reasoning about global compositional distributed systems with opaque components that have dynamic interfaces and interact by using asynchronous messages. Unlike Fortran M, sessions in accordance with the present invention provide a hybrid technique for running communicating distributed processes that are frozen when they are not performing any work, yet have persistent state that can be revived whenever a new session is initiated. This persistence model differs from mechanisms provided as recent ORB services by supporting interaction not just through a broker or server, but also directly between the ports of distributed processes in a peer-to-peer fashion.

The present invention deals with providing software components and compositional methods that support the development of correct distributed applications. The methods employed by Web users for developing client-server applications are not the best methods for developing correct peer-to-peer distributed applications. Furthermore, approaches for debugging sequential programs are inadequate for ensuring correctness in distributed applications. The invention provides methods and approaches to deal with the difficult problems of distributed systems—problems such as deadlock, livelock, and sending unbounded numbers of messages—that are not issues in sequential programs.

In particular, certain kinds of distributed systems are inherently complex, deal with myriad functions, have strict performance requirements, and have disastrous consequences of failure; examples of these systems include applications in telemedicine, air traffic control, and military command. Such systems are developed in a painstaking manner, with each system design led by a single group of expert designers that has primary responsibility for the entire system. By contrast, many Web-based applications are relatively simple, are collaborative by nature, have limited functionality, are performance-limited by the GII, and may be developed by people who are not experts in concurrent computing. Designers of such applications have little control over the networks, protocols, operating systems, and computers on which their applications execute.

Computer Implementation

Although the preferred embodiment of the invention is implemented in a Java-like computer language, the invention may be implemented in hardware or other software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. The program code is executed on the processors to perform the functions described herein.

Further, each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A distributed system framework for a networked environment, including a plurality of process objects, each of said process objects including:

(a) a program method for creating at least one inbox for storing messages received from another process object;

(b) a program method for creating at least one outbox for storing messages to be transmitted to another process object;

(c) a freeze method that saves a state of the process object to persistent storage, thereby changing the process object to a frozen process object which does not use operating system resources;

(d) a thaw method that restores the frozen process object from the persistent storage, thereby changing the frozen process object to a ready process object;

(e) a program method for interconnecting each created outbox of the process object to a created inbox of at least one other process object, thereby establishing a personal network between the process object and such other process objects within a communication session to perform at least one task by passing messages between the interconnected outboxes and inboxes;

wherein each message includes a snapshot variable that indicates whether a process object has recorded its state; and wherein the snapshot variable is a date field, and each process object includes a snapshot method that eaves the state of the process object if a date field value within a received message is later than current date value for the process object, updates the current date value for the process object to the date field value of the received message, and increments a clock for the process object to a value exceeding the date field value of the received message.

2. The distributed system framework of claim 1, wherein each message includes a snapshot variable that indicates whether a process object has recorded its state.

3. The distributed system framework of claim 1, wherein the summoning response method causes the thaw method of the process object to be invoked if the process object is frozen when summoned by another process.

4. The distributed system framework, of claim 1, each process object further including a summoning response method, for instantiating the process object if the process object is summoned by another process object.

5. The distributed system framework of claim 1, each process object further including at least one mail daemon object, for controlling the order of messages in each inbox.

* * * * *